(12) United States Patent
Grewe

(10) Patent No.: US 12,043,089 B2
(45) Date of Patent: Jul. 23, 2024

(54) WINDOW VENT

(71) Applicant: Douglas William Grewe, Anna, OH (US)

(72) Inventor: Douglas William Grewe, Anna, OH (US)

(73) Assignee: LOCHARD, INC., Sidney, OH (US)

( * ) Notice: Subject to any disclaimer, the term of this patent is extended or adjusted under 35 U.S.C. 154(b) by 279 days.

(21) Appl. No.: 17/148,142

(22) Filed: Jan. 13, 2021

(65) Prior Publication Data

US 2022/0219507 A1 Jul. 14, 2022

(51) Int. Cl.
*B60H 1/26* (2006.01)
*B60H 1/24* (2006.01)

(52) U.S. Cl.
CPC ............ *B60H 1/267* (2013.01); *B60H 1/242* (2013.01)

(58) Field of Classification Search
CPC ............ B60H 1/267; B60H 1/242; B60J 1/20
See application file for complete search history.

(56) References Cited

U.S. PATENT DOCUMENTS

| | | | | |
|---|---|---|---|---|
| 1,588,654 A * | 6/1926 | Brownlee | ............ | B60H 1/267 454/133 |
| 1,616,297 A | 2/1927 | Alber | | |
| 1,852,898 A * | 4/1932 | Rabourn | ................ | B60H 1/267 454/133 |
| 1,982,455 A | 11/1934 | Sansbury | | |
| 2,757,725 A | 8/1956 | Kulisch | | |
| 2,780,458 A | 2/1957 | Thaxton | | |
| 2,997,103 A | 8/1961 | Buchanan | | |
| 3,509,812 A * | 5/1970 | Joseph | ..................... | F24F 13/12 454/332 |
| 5,570,542 A | 11/1996 | Cameron | | |
| 6,042,473 A * | 3/2000 | McClary | ................. | B60H 1/267 454/131 |
| 7,137,427 B2 | 11/2006 | Muramoto et al. | | |
| 7,832,455 B1 | 11/2010 | Johnston et al. | | |

FOREIGN PATENT DOCUMENTS

| | | | | |
|---|---|---|---|---|
| DE | 29704966 U1 * | 6/1997 | ............. | B60H 1/267 |
| DE | 10054710 A1 | 7/2002 | | |
| FR | 2748237 A1 * | 11/1997 | ................ | B60J 1/20 |
| KR | 20120007160 U * | 10/2012 | | |

OTHER PUBLICATIONS

English translation DE-29704966-U1 Jun. 1997 (Year: 1997).*
English translation KR-20120007160-U Oct. 2012 (Year: 2012).*
Translation FR-2748237-A1, Nov. 1997 (Year: 1997).*

(Continued)

*Primary Examiner* — Jessica Yuen
(74) *Attorney, Agent, or Firm* — Thompson Hine LLP

(57) ABSTRACT

A window vent system including a window vent having a unitary, one-piece panel body including a first panel portion and a second panel portion oriented generally parallel to the first panel portion. The first panel portion has a set of openings formed therein and the second panel portion has a set of openings formed therein. Each opening of the second panel portion is at least partially aligned with an opening of the first panel portion.

13 Claims, 5 Drawing Sheets

(56) References Cited

OTHER PUBLICATIONS

Hulsberg GmbH & Co KG, product information for window vent, 2 pages (2019).
Hülsberg GmbH & Co KG, advertisement for window vent, 1 page (2019).
Hülsberg GmbH & Co KG, photograph (#1) of window vent, 1 page (2019).
Hülsberg GmbH & Co KG, photograph (#2) of window vent, 1 page (2019).
Hülsberg GmbH & Co KG, photograph (#3) of window vent, 1 page (2019).
Hülsberg GmbH & Co KG, photograph (#4) of window vent, 1 page (2019).
Hülsberg GmbH & Co KG, photograph (#5) of window vent, 1 page (2019).

* cited by examiner

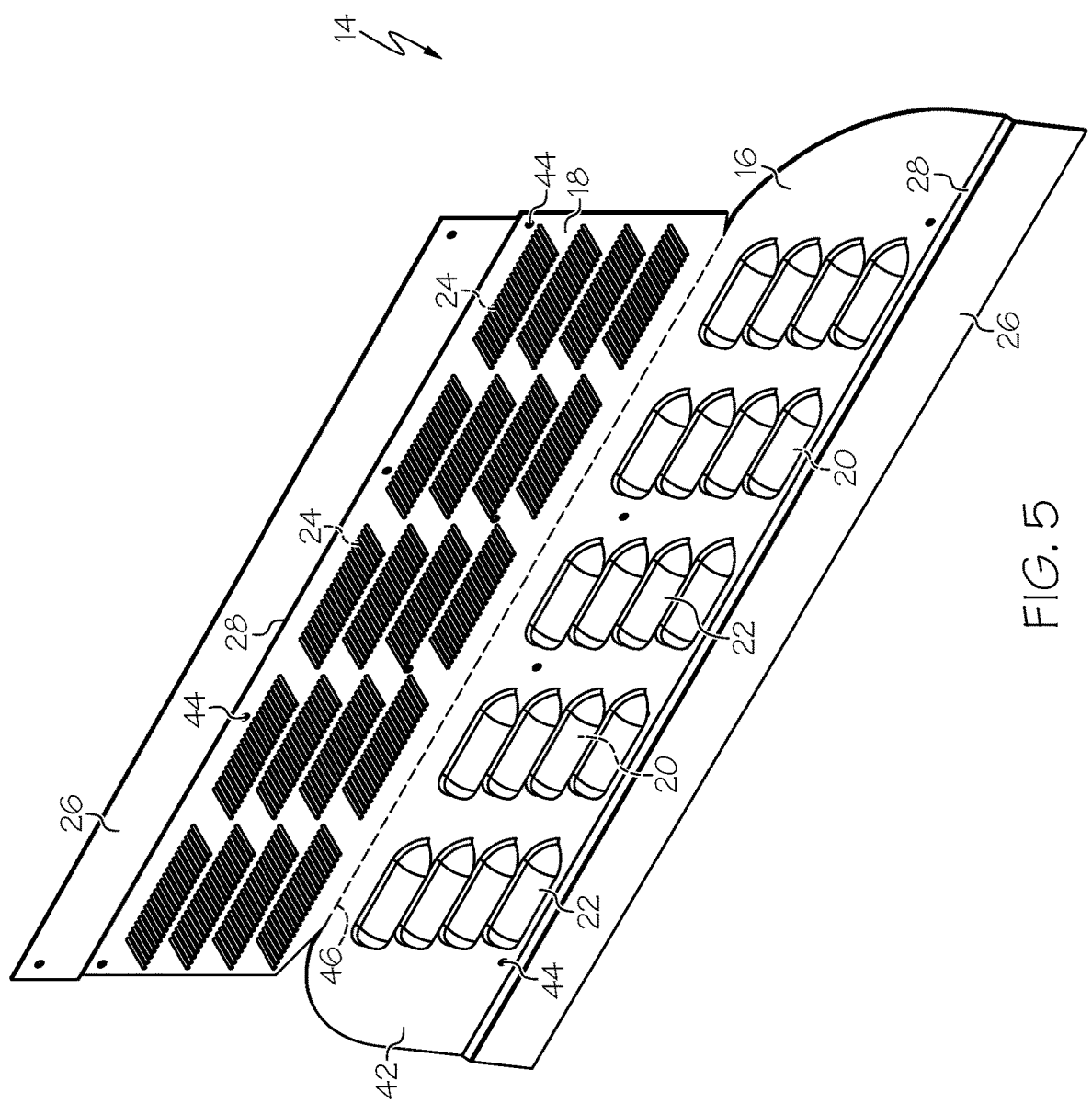

WINDOW VENT

The present disclosure is directed to a window vent, and more particularly, to a window vent that can be positioned in a window opening to provide ventilation.

BACKGROUND

Window vents can be inserted into a window opening to provide ventilation to the associated interior space. Such window vents typically include an opening, and a screen or mesh positioned over the opening to allow air to flow therethrough but to block insects, debris or other undesired components from entering. However, many existing window vents can be ineffective and/or challenging to manufacture.

SUMMARY

In one embodiment the present disclosure is directed to a window vent which is configured to allow sufficient air flow and is relatively easy to manufacture. In particular, in one embodiment the invention is a window vent system including a window vent having a unitary, one-piece panel body including a first panel portion and a second panel portion oriented generally parallel to the first panel portion. The first panel portion has a set of openings formed therein and the second panel portion has a set of openings formed therein. Each opening of the second panel portion is at least partially aligned with an opening of the first panel portion.

BRIEF DESCRIPTION OF DRAWINGS

FIG. 5 is a front perspective view of a precursor of the window vent, showing an intermediate step in the manufacture thereof.

DETAILED DESCRIPTION

Figure 1:
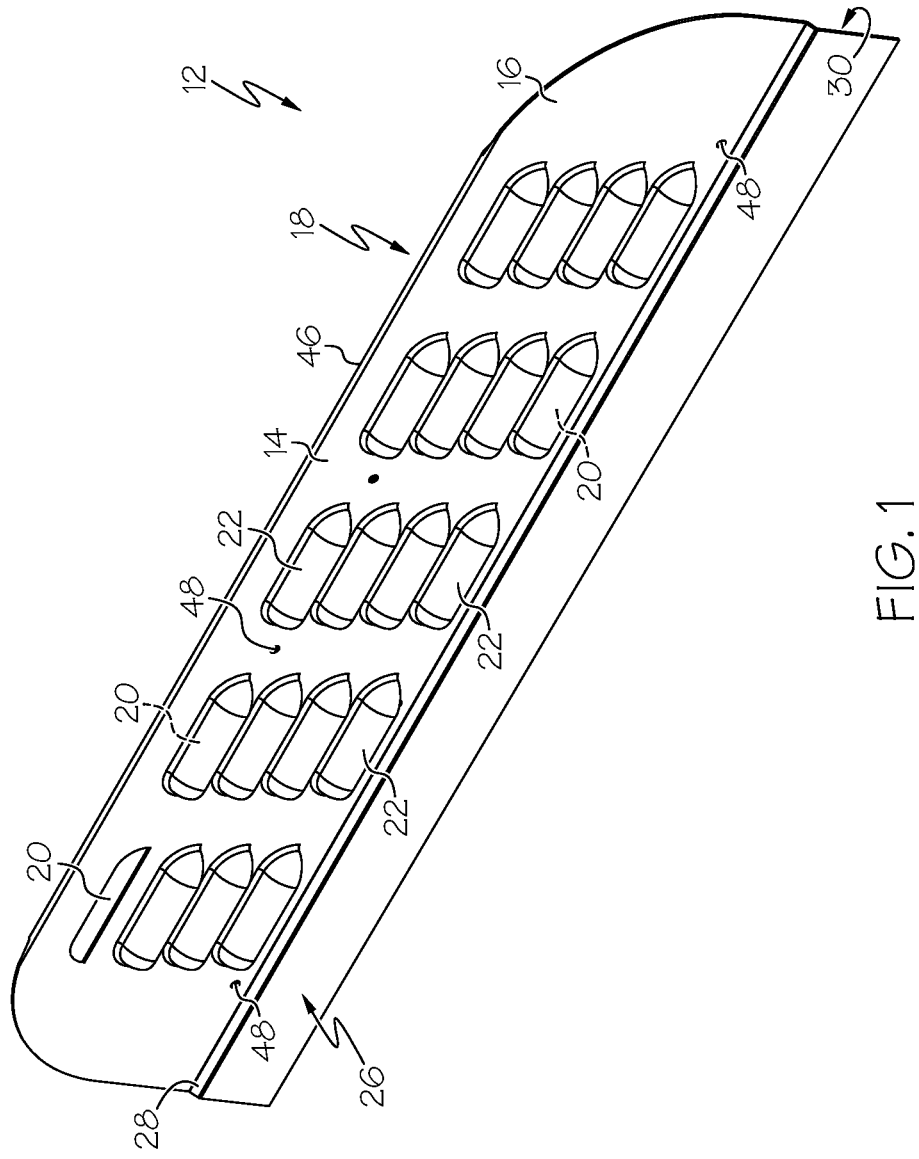
FIG. 1 is a front perspective view of one embodiment of the window vent of the present disclosure.

The window vent system 10 (FIG. 4) can include a window vent 12 (FIGS. 1-3) which can include a panel body 14 having a first panel portion 16 and a second panel portion 18 oriented generally parallel to the first panel portion 16. The first panel portion 16 can include a plurality of openings 20 (first openings) formed therethrough. The first panel portion 16 can further include a plurality of louvers 22, where each louver 22 is positioned adjacent to and generally covers an associated first opening 20. Each louver 22 is, in one embodiment, positioned above the upper and/or side surfaces of an associated first opening 20 to block or limit the entry of rain or moisture through the first openings 20. The vertically-stacked arrangement of louvers 22 can help to limit the entry of rain or moisture, as rain/moisture from an upper louver 22 can be smoothly directed to a lower louver 20 which deflects the rain/moisture.

In FIG. 1 one of the louvers 22 (in the upper left corner) is removed/not shown, for illustrative purposes, to show the corresponding shape and configuration of an exemplary first opening 20. In one embodiment, each of the first openings 20 can have an average/effective length dimension (extending generally left-to-right in FIG. 1) of about 2-½" and an average/effective height dimension (extending generally in the vertical direction of FIG. 1) of about 0.5", resulting in each first opening 20 having a surface area of about 1.25 square inches in one case. In the illustrated embodiment the first panel portion 16 has twenty first openings 20, leading to a total surface area, of the first openings 20, of about twenty-five square inches. However, the size, shape, number, location and surface area of the first openings 20 can be varied as desired. For example, in one case the number of first openings 20 is greater than four, or greater than ten, or less than fifty.

The first openings 20 can be provided in sufficient size and/or quantity to provide sufficient ventilation through the window vent 12. Thus in one embodiment the first openings 20 have a total/combined surface area of at least about five percent of the surface area first panel portion 16/window vent 12, or in another embodiment at least about ten percent, or another embodiment at least about fifteen percent. However, the total surface area of the first openings 20 may be desired to not be too large to ensure sufficient structural integrity to the first panel portion 16/window vent 12. Accordingly, in one embodiment the first openings 20 may comprise less than about ninety percent of the surface area of the first panel portion 16/window vent 12, or less than about seventy-five percent in another embodiment, and less than about fifty percent in yet another embodiment.

The second panel portion 18 can have a set of openings 24 therein (second openings) that are generally aligned with the first openings 20 to allow air to flow through the panel body 14/window vent 12. The second openings 24 can each be relatively small to limit the entry of insects, debris or other undesired components. In the illustrated embodiment, each second opening 24 is a relatively narrow, long slot-like opening, with its smallest dimension, in a two dimensional plane (in the transverse direction A of FIG. 2), of less than about 4 millimeters in one case, and less than about 2 millimeters in another case, and greater than about 1 millimeter in yet another case, to ensure sufficient air flow.

The slot-like second openings 24 can be positioned at an angle relative to the height dimension of the second panel portion 18/window vent 12. The second openings 24 are shown at an illustrated angle of forty-five degrees, but the angle can vary in one case between about twenty and seventy degrees. However, the second openings 24 may not be angled at all, and can be arranged strictly vertically and/or horizontally if desired. In addition, the second openings 24 need not be slots, but can instead take the form of various other shapes including circles, squares, triangles, curved slots, "zig-zagged" slots, irregular shapes, etc. The total surface area of the second openings 24, compared to the total surface area of the second panel portion 18/window vent 12 can be in the same ranges as the first openings 20 relative to the first panel portion 16/window vent 12 as described above.

The second openings 24 can be arranged in groups and all or most of the second openings 24 of a group can be at least partially aligned with an associated first opening 20 or openings to allow air to flow therethrough for ventilation, but the relatively small size of the second openings 24 can block insects, debris or other undesired components from entering or passing through the window vent 12. In the illustrated embodiment, each first opening 20 is significantly larger in surface area than each second opening 24 to allow ventilation, e.g. at least about ten times larger in surface area in one case, or at least about twenty times larger in another case. Thus, each first opening 20 may have a plurality of second openings 24 corresponding thereto. In the illustrated embodiment, there are twenty-two second openings 24 associated with each first opening 20, but this number can vary as desired and can be at least five or at least ten in one case, and less than about fifty or less than about twenty-five in another case.

Figure 3:
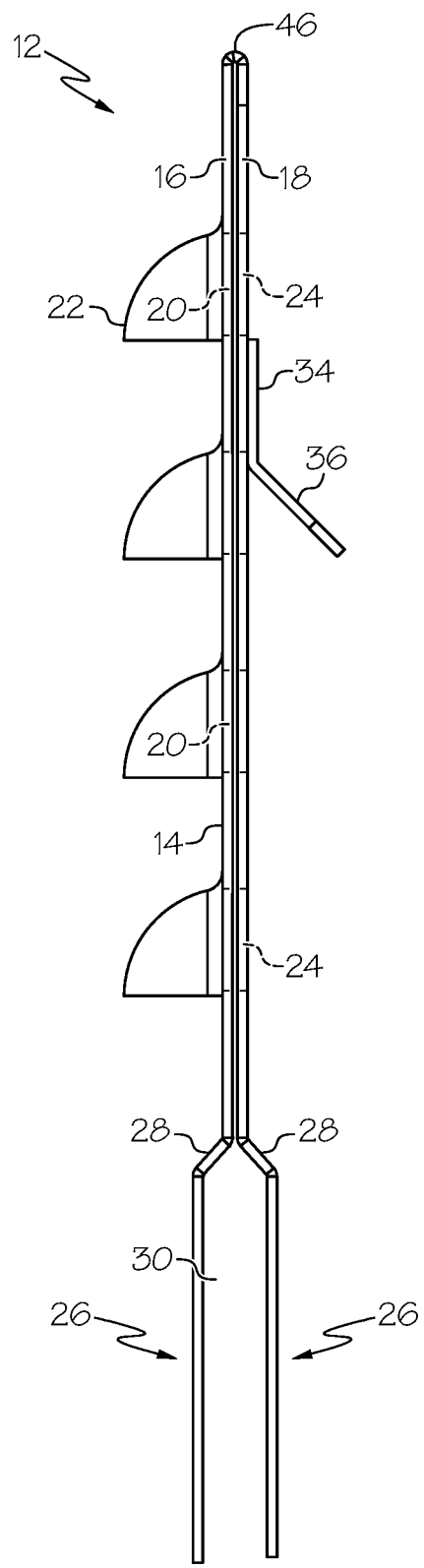
FIG. 3 is an end view of the window vent of FIG. 1.

As shown in FIG. 3, the first panel portion 16 can have a flared-out portion 26 along a bottom edge thereof including or connected by an angled portion 28, and the second panel portion 18 can similarly include a flared-out portion 26 including or connected by an angled portion 28 thereof. The flared-out portions 26 can define a channel 30 therebetween extending in the height direction of the window vent 12 to receive a window therein 32, as will be described in greater detail below. In one embodiment, the channel 30 may have a width of about seven millimeters, although the window of the channel 30 can be varied as desired. For example, in one case the channel 30 has a width larger than about four millimeters and/or smaller than about ten millimeters. As can be seen in FIG. 1, in one case the channel 30 (defined by the flared-out portion 26 and optionally the angled portion 28) can extend about twenty-five percent of the height of the window vent 12, and in one embodiment extends at least about ten percent of the height of the window vent 12 and/or less than about fifty percent of the height of the window vent 12.

Figure 2B:
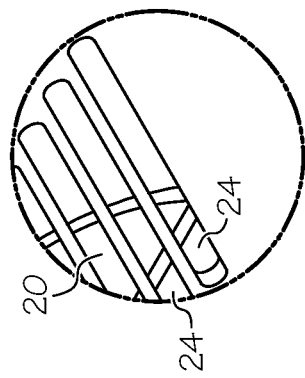
FIG. 2B is a detail view of the area indicated in FIG. 2A.
Figure 2A:
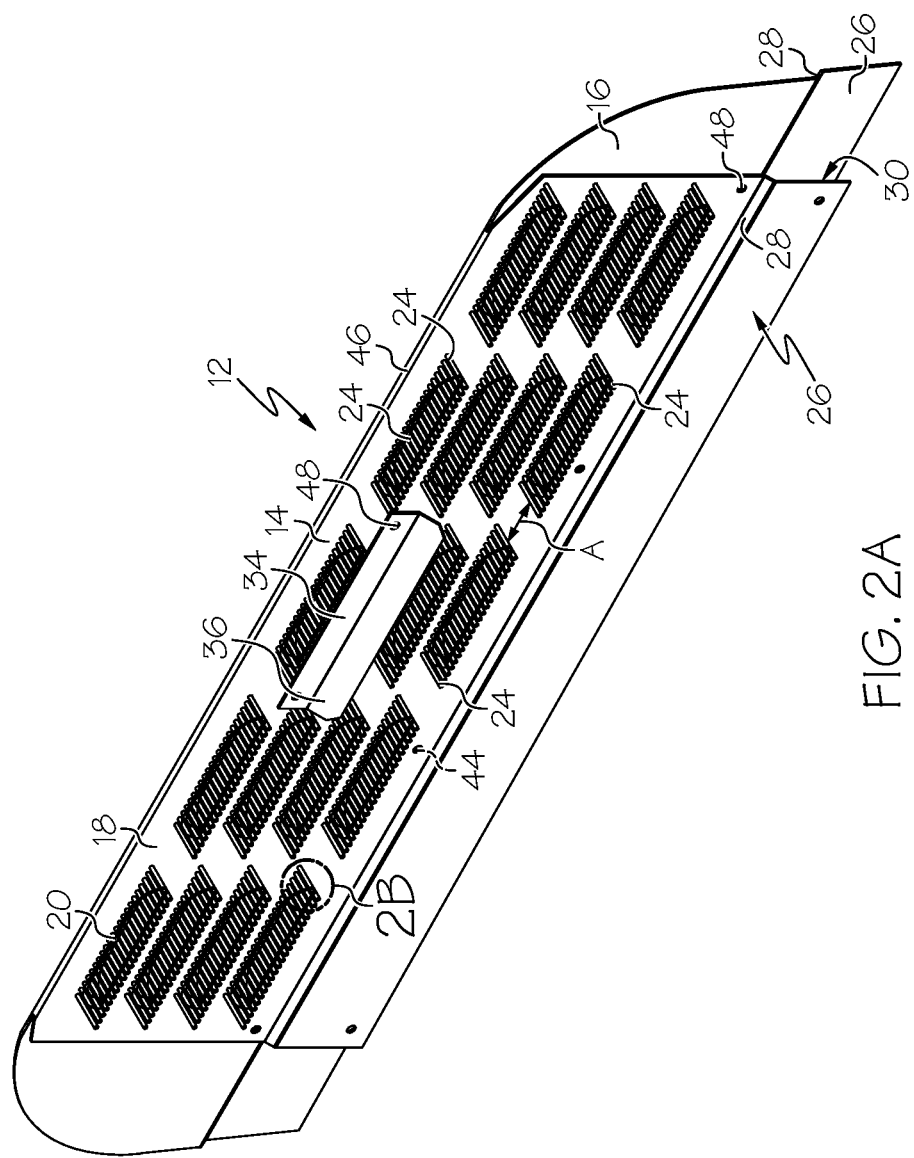
FIG. 2A is a rear perspective view of the window vent of FIG. 1.

As best shown in FIGS. 2 and 3, in one embodiment the window vent 12 can include a handle 34 coupled to panel body 14/second panel portion 18. The handle 34 includes an angled gripping portion 36 extending away from the panel body 14/second panel portion 18 such that a user can grip the handle 34 for installation/removal of the window vent 12.

Figure 4:
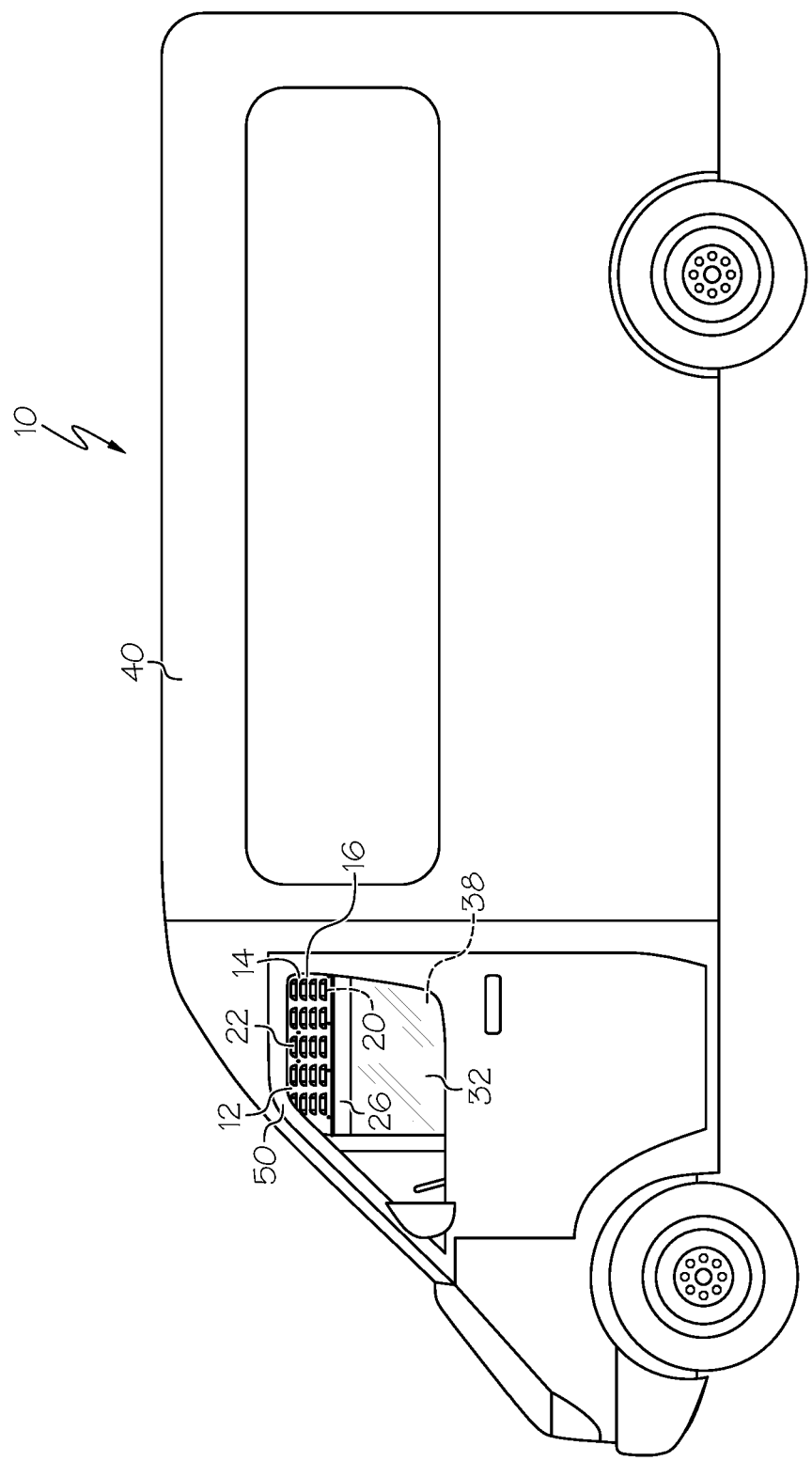
FIG. 4 is a side view of a vehicle showing the window vent of FIG. 1 inserted therein.

The window vent 12 of FIGS. 1-3 can be used with a window 32 or pane of glass positioned in a window opening 38, such as the window 32 and window opening 38 as shown in FIG. 4 in context with a motorized vehicle/trailer/recreational vehicle 40. The window 32 can be vertically moved between an upper or closed position, and a lower, fully or partially, retracted position. In order to utilize the window vent 12, the window 32 is first retracted down to a sufficient height, and the window vent 12 inserted into an upper portion of the window opening 38. The window 32 is then raised until the upper edge of the window 32 is closely received in the channel 30, and the window 32 is then further raised until the upper edge of the window vent 12 is positioned securely within the window casing or weather stripping, molding, gasket etc. The window vent 12 can be positioned such that the first panel portion 16 and louvers 22 are outward-facing and the second panel portion 18 and handle 34 are inward-facing such that a user on the inside of the vehicle 40 can grip the handle 34 and easily manipulate the window vent 12 in place. In the particular view and embodiment of FIG. 4, part of the window vent 12 (the upper left corner) happens to not be visible behind a deflector or baffle 50 of the vehicle 40.

After installation of the window vent 12, the window 32 covers part of the window opening 38 and the window vent 12 covers the remainder of the window opening 38. In this manner the window vent 12 is held securely in place, and the window vent 12 allows ventilation therethrough and prevents insects, debris or other undesirable components from entering the vehicle 40 through the window opening 38. The window vent 12 can be used in one case while the vehicle 40 is not moving, to allow outside air to circulate and assist in controlling the temperature in the vehicle 40 by the natural flow of air through the window vent 12. While FIG. 4 illustrates the window vent 12 in conjunction with a particular window 32 of a particular vehicle 40, it should be understood that the window vent 12 can be used in nearly any window system with a retractable window, including cars, trucks, vans, motorized recreational vehicles, trailers, homes, office buildings, etc. The window vent 12 may be customized in size and shape and configuration to match the size and shape of the corresponding window opening.

In order to form the window vent 12 of FIGS. 1-3, a blank piece of material having an outline in the shape of the piece of material 42 shown in FIG. 5 can be provided. In one embodiment the piece of material 42 is a unitary, integral, seamless, one-piece component made of metal or other materials. As shown, in one embodiment the second panel portion 18 has a somewhat different size and/or shape than the first panel portion 16, and in particular is somewhat smaller than the first panel portion 16 in surface area. The second panel portion 18 can be smaller than the first panel portion 16, so long as, in one case, the second panel portion 18 (or the openings 24) covers each of the first openings 20 when the window vent 12 is formed. Moreover, the second panel portion 18 can be the same size as the first panel portion 16, or if desired larger than the first panel portion 16.

The first openings 20 can then be formed in the first panel portion 16 such as by cutting, punching, etc., and the louvers 22 can then be positioned over each first opening 20. Alternatively, the louvers 22 can be formed by deforming or pushing outwardly portions of material corresponding to the first openings 20 by molding and/or shaping to provide the desired shape to the louvers 22. The second openings 24 can then be formed in the second panel portion 18, such as by cutting, punching, etc. In this case, then the openings 20, 24 are formed simply by removing material from the piece of material 42/panel portions 16, 18. Next, the flared-out portions 26 and angled portions 28 can be formed in the panel portions 16, 18 by bending, forming or the like. Finally, if desired holes or openings 44 for rivets 48 or other attachment means can be formed in the piece of material 42.

The piece of material 42 is then folded about the fold line 46 which is at the junction between the panel portions 16, 18 and will form or define the upper edge of the window vent 12 such that the first panel portion 16 and second panel portion 18 are parallel and in close or at least partial facial contact with each other as shown in FIG. 3. If desired, fasteners, such as rivets 48 in the illustrated embodiment, can then be passed through aligned openings of the first 16 and second 18 panel portions to couple the first 16 and second panel 18 portions together and ensure they remain in position, and to secure the handle 34. Various other means or mechanisms for securing the first 16 and second panels 18, and the handle 34 can be utilized, such as threaded fasteners, adhesives, welds, solder attachments, clips, brackets, brazes, etc., all of which are termed a "fastener" herein.

The method of making/formation and resultant window vent 12 provides several advantages. First, the window vent 12 is formed from a single piece of material 42 which provides greater strength, ease of assembly and reduced manufacturing steps. In addition, the resultant window vent 12 is secured by a continuous portion/material along its upper edge (the seam along fold line 46) which is strong and inherently moisture-proof/waterproof. In addition, the first 20 and second 24 openings are automatically aligned so long as the folding/bending process is carried out properly, and separate alignment and attachment steps are eliminated.

In some window vent designs, a separate screen is provided and attached to the rear of the panel body 14. That method and system can result in a gap along at least the upper edge of the screen, and requires additional alignment and attachment steps. In addition, the second panel portion 18 of the current window vent 12 integrates together, as a single piece, the screen/mesh (provided by the second openings 24) and the flared-out portion 26 on the back side of the window vent 12. In previous designs, a separate screen and separate flared-out portion may be provided, which requires additional steps and precise assembly, increasing costs and difficulty of manufacture.

Having described the invention in detail and by reference to the preferred embodiments, it will be apparent that modifications and variations thereof are possible without departing from the scope of the invention.

What is claimed is:

1. A window vent system comprising:
a window vent including a panel body having a first panel portion and a second panel portion oriented generally parallel to the first panel portion, wherein the first panel portion has a set of openings formed therein and the second panel portion has a set of openings formed therein, wherein each opening of the second panel portion is at least partially aligned with an opening of the first panel portion, wherein the window vent includes a channel positioned along a lower edge of the panel body to closely receive an upper edge of a window, wherein the channel extends less than about fifty percent of a height of the window vent, and wherein the panel body is a seamless metal body that is folded about itself along an upper edge thereof at a junction between the first panel portion and the second panel portion.

2. The system of claim 1 wherein a smallest dimension of each opening of the second panel portion is less than about 4 mm.

3. The system of claim 1 wherein the first and second panel portions are in at least partial facial contact with each other, and wherein the window vent further includes a fastener securing the first and second panel portions together.

4. The system of claim 1 wherein the first panel portion is larger in front view than the second panel portion.

5. The system of claim 1 wherein each opening of the first panel portion is at least about ten times larger in surface area than a corresponding opening of the second panel portion.

6. The system of claim 1 wherein each opening of the first panel portion is aligned with at least ten openings of the second panel portion.

7. The system of claim 6 wherein the first panel portion includes at least ten openings.

8. The system of claim 1 wherein a smallest dimension of each opening of the second panel portion is less than about 2 mm.

9. The system of claim 1 wherein each opening of the second panel portion is a relatively narrow, long slot-like opening and is oriented at an angle, relative to a height dimension of the window vent, of between about 20 degrees and about 70 degrees.

10. The system of claim 1 wherein the first panel portion includes a plurality of louvers, each louver being positioned adjacent to an associated opening of the first panel portion.

11. The system of claim 1 wherein at least one of the first panel portion or the second panel portion includes a flared-out portion at least partially defining the channel.

12. The system of claim 1 wherein the window vent further includes a handle coupled to the second panel portion and extending at least partially away therefrom.

13. The system of claim 1 further comprising an automotive vehicle or recreational vehicle having a window opening and an associated retractable window, wherein the window covers part of the window opening and the window vent covers a remainder of the window opening, and wherein an upper part of the window is received in the channel.

* * * * *